United States Patent [19]

Gorman et al.

[11] 4,084,737

[45] Apr. 18, 1978

[54] OILLESS FLUID FOR SCORING GLASS

[75] Inventors: Harold R. Gorman, Oakmont; John R. Dahlberg, Jeannette; James L. Oravitz, Jr., Cheswick, all of Pa.

[73] Assignee: PPG Industries, Inc., Pittsburgh, Pa.

[21] Appl. No.: 714,880

[22] Filed: Aug. 16, 1976

[51] Int. Cl.$^2$ ............................................ C03B 33/02
[52] U.S. Cl. ............................................ 225/2; 83/7; 83/22; 252/58
[58] Field of Search ................. 83/169, 22, 7; 252/58; 225/2, 96.5

[56] References Cited

U.S. PATENT DOCUMENTS

| | | | |
|---|---|---|---|
| 1,988,565 | 1/1935 | Owen | 83/169 X |
| 3,126,636 | 3/1964 | Brand | 33/32 |
| 3,129,182 | 4/1964 | McLean | 252/54 |
| 3,461,755 | 8/1969 | Gerew et al. | 83/12 |
| 3,480,549 | 11/1969 | Carlos et al. | 252/54 |
| 3,618,461 | 11/1971 | Parker | 90/11 C |
| 3,850,063 | 11/1974 | Witkoski | 83/169 X |
| 3,894,456 | 7/1975 | Boller et al. | 83/169 X |
| 3,909,431 | 9/1975 | Figiel | 252/54 |
| 3,928,013 | 12/1975 | French | 65/97 |

*Primary Examiner*—Frank T. Yost
*Attorney, Agent, or Firm*—Donna L. Seidel

[57] ABSTRACT

A cutting fluid is disclosed comprising one or more halogenated hydrocarbons dissolved in one or more paraffin, naphtha, or aromatic solvents. Use of the cutting fluid produces a glass edge with increased edge strength compared with a cut edge produced by dry scoring. The cutting fluid is completely evaporative, leaving no residue, thus eliminating the need for washing. Further, use of the cutting fluid extends the useful life of the cutting tool. Blends are formulated to meet specific evaporation rates required by variations in wareroom equipment and practices.

8 Claims, 3 Drawing Figures

CUTTING WHEEL PERFORMANCE CHARTS OF 134°, 145° AND 150° 7/32" DIAMETER TUNGSTEN CARBIDE WHEELS SCORING DRY AND SCORING THROUGH THE CUTTING FLUID OF EXAMPLE IV

OILLESS FLUID FOR SCORING GLASS

BACKGROUND OF THE INVENTION

1. Field of the Invention

This invention relates generally to the art of cutting glass and particularly to the art of scoring glass in the presence of a fluid.

2. Description of the Prior Art

The cutting of individual glass articles from a large glass sheet or ribbon is generally accomplished by moving a glass-cutting tool across the surface of the glass with sufficient force to effect a score in the surface of the glass. This may be done with no fluid (dry scoring) or in the presence of a fluid. Cutting fluids may be used for the purpose of lubricating the cutting wheel and axle and the glass, but are now generally used primarily to prevent or retard healing of the score. It is known that healing is retarded by excluding atmospheric moisture from a score. Therefore, cutting fluids are typically in the form of oils or oils mixed with solvents.

U.S. Pat. Nos. 3,894,456 and 3,914,180 to Boller et al. disclose a cutting fluid which comprises methyl chloroform and a non-volatile hydrocarbon oil. The methyl chloroform acts as a cutting tool lubricant, then, being highly volatile, evaporates. The hydrocarbon oil, being non-volatile, forms a residue which binds wing chips along the edge of the score thus preventing spalling. An emulsifying agent may be added to the cutting fluid to aid washability for removal of the non-volatile oil from the glass surface.

Belgian Pat No. 819,914 to Simpkin et al. discloses a cutting fluid comprising a hydrophobic cutting oil and a hydrophobic organic solvent. The oil is thought to reduce lateral cracks produced along the score by water vapor in the atmosphere and consequently to reduce the force required subsequently to snap the glass score while the solvent acts as a thinner and is removed by evaporation.

SUMMARY OF THE INVENTION

The present invention relates to an improved glass cutting fluid which contains no oil and leaves no residue on the glass surface, thereby eliminating the need for washing. More particularly, this invention relates to a method of cutting glass employing an oilless cutting fluid which produces a spall-free cut glass edge having increased edge strength over an edge cut by dry scoring and which also extends the useful life of the cutting tool.

The primary component of the improved glass cutting fluid of the present invention is a halogenated hydrocarbon. The cutting fluid of the present invention may consist essentially of a liquid halogenated hydrocarbon or may comprise a halogenated hydrocarbon and a paraffin, naphtha or aromatic solvent. The cutting fluid need not contain an emulsifying agent to render the fluid water-washable since the cutting fluid is essentially completely removed by evaporation. Solutions or blends are adjusted for evaporation rates to meet the specific conditions imposed by production procedures and both automatic and manual operation equipment.

The method of cutting glass of the present invention involves effecting a score on the surface of the glass in the presence of the cutting fluid of the present invention and propagating the score to produce a cut through the glass. The cut edge of glass scored by the method of the present invention has increased edge strength compared with a cut edge of glass scored in the absence of the cutting fluid of the present invention.

DETAILED DESCRIPTION OF THE PREFERRED EMBODIMENTS

Figure 1:
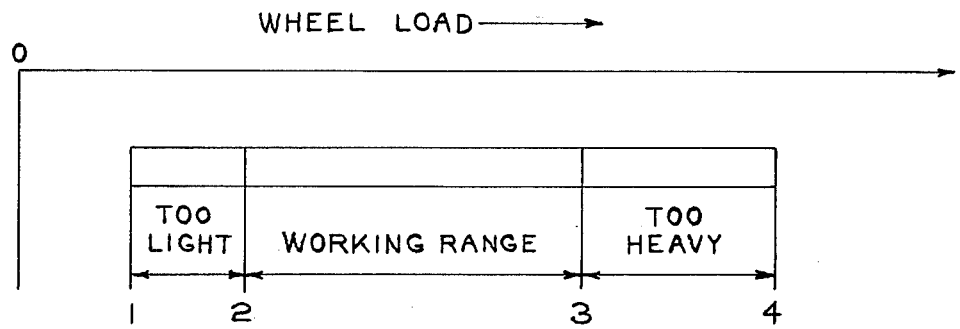
FIG. 1 illustrates a cutting wheel performance chart which defines the working range of a cutting wheel as a function of wheel load. The minimum wheel load at which a fissure starts is shown at 1. The working range of the wheel is defined by 2 and 3, the range of wheel load at which a fissure which can consistently be opened is generated without the occurrence of instant healing (formation of lateral vents which erupt with the glass surface). The wheel load at which the glass surface is crushed is shown at 4.
Figure 2:
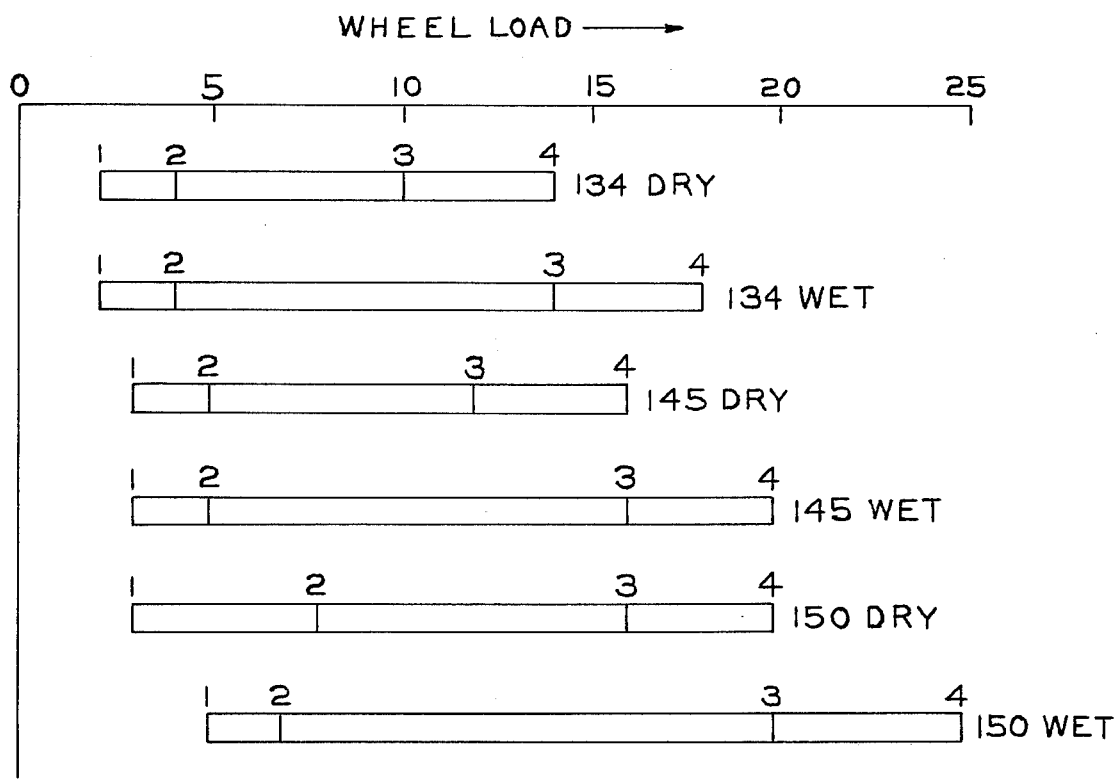
FIG. 2 displays cutting wheel performance charts of 134°, 145° and 150° wheels scoring dry and scoring through a cutting fluid of the present invention. The same performance parameters are defined by points 1, 2, 3 and 4 as in FIG. 1.

A cutting fluid is applied at the interface of a scoring tool edge and a major surface of a sheet of glass, supported on a substantially flat surface, along the intended scoring path. The cutting fluid comprises a halogenated hydrocarbon, preferably a chlorinated hydrocarbon such as 1,1,1-trichloroethane or perchloroethylene. The halogenated hydrocarbon is preferably used in combination with a paraffin, naphtha or aromatic solvent in order to permit adjustment of evaporation rate, fire resistance, cost and the like to satisfy specific needs of a cutting operation. A naphtha solvent is preferred for cutting flat glass in a primary glass manufacturing factory in which high speed, automatic cutting is accomplished.

The cutting fluid preferably comprises from 2 to 98 percent by volume halogenated hydrocarbon and from 98 to 2 percent by volume solvent. Selection of cutting fluid components and proportions will vary with such factors as cutting process, design of cutting and wareroom systems and materials, and desired score quality and edge strength.

The cutting fluid may be applied as a liquid or mist according to any of the techniques known in the glass cutting art. Preferably, the cutting fluid is applied continuously, such as by flowing down the cutting tool and transferring to the glass surface being scored.

The cutting tool is preferably a cutting wheel made from steel or tungsten carbide or other material having suitable properties. The cutting wheel has a glass contact edge with a cutting angle preferably between about 115° and 155°. The cutting wheel is moved across the surface of the glass along the intended scoring path with sufficient force to effect a score, i.e., to produce a major vent in the glass essentially perpendicular to the glass surface.

The range of force sufficient to effect a score which can be consistently opened without causing lateral vents to erupt with the glass surface adjacent the score (spalling) is the working range of wheel load. Use of the cutting fluids of the present invention expands the working range by allowing the use of higher wheel loads. Since it has been found that wheel load must be increased as the wheel wears to obtain acceptable score quality, expansion of the working range as in the present invention extends the useful life of the cutting wheel.

After the glass surface is scored, the score is propagated to produce a cut through the glass such as by applying a bending moment about the score causing the glass to fracture with a resultant smooth, straight, strong, spall-free edge perpendicular to the major surfaces of the glass. Preferably the scored glass is opened either manually using glass cut-running pliers commonly employed in the art or is opened mechanically by snapping.

Since the cutting fluid of the present invention is completely removed by evaporation, the cut glass edge is free of any residue and does not require washing. The cut glass edge exhibits greater edge strength than the cut edge of glass scored without the cutting fluid of the present invention.

The invention may be further illustrated by the specific examples which follow.

EXAMPLE I

A cutting fluid is prepared having a composition of 75 percent by volume 1,1,1-trichloroethane and 25 percent by volume of a naphtha solvent available from Ashland Chemical Co. under the designation Rule 66 Mineral Spirits (7 percent aromatics). Test strips of 7/32 inch (6 millimeter) thick soda-lime-silica float glass measuring 4 by 26 inches (about 100 by 800 millimeters) are cleaned with a solution of a commercial glass cleaner. A test strip is placed atop a wooden sled which travels along the base of a scoring apparatus beneath a cutting head positioned midway down the length of the base. A six pound load is applied to the horizontal pan affixed to the top of the cutting head which is equipped with a 7/32 inch (6 millimeter) diameter tungsten carbide cutting wheel having a 180 grit surface finish (regular grind) and a 145° cutting angle. A film of cutting fluid approximately twice the width of the cutting wheel is applied at the midpoint of the width of the glass strip along its entire length. The sled bearing the glass test strip is then driven at a rate of 1 foot per second beneath the cutting wheel to effect a score on the glass surface along the path of the cutting fluid. The same procedure is carried out with additional test strips. After the scores are opened, using conventional glass score opening apparatus, the edge strengths of the cut edges are measured by beam load testing. The samples, which bear no residue since the cutting fluid is completely evaporative, are placed on a Baldwin Tester loading at a rate of 1000 pounds per square inch per minute until glass failure. The samples exhibit an average edge strength of 13,218 pounds per square inch, an increase of 43 percent over the edge strength of 9270 pounds per square inch measured for the cut edges of glass scored with no cutting fluid.

EXAMPLE II

A large sheet of 7/32 inch (6 millimeter) float glass is cleaned as in Example I. A cutting fluid essentially of dichlorobenzene of which about 80 percent is orthodichlorobenzene is applied to the surface defining a rectangular scoring pattern measuring 36 by 48 inches. The glass is cut by picture-frame scoring and opening using the same type cutting wheel and load (145° and 6 pounds) as in Example I. Edge strength of the cut edge is measured by thermal loading to permit effective measurement of 120 inches of cut edge as opposed to 10 inches by beam loading. Thermal loading is accomplished by placing on the sample a 34½ inch by 46½ inch heating blanket and electrically heating until glass failure. The stress at breakage is estimated from the mirror radius at the origin. The edge strength of the sample scored with dichlorobenzene is 9000 pounds per square inch compared with 6770 pounds per square inch for the cut edge of glass scored with no cutting fluid.

EXAMPLE III

Test glass strips are cleaned, scored and opened as in Example I except that the cutting fluid comprises 75 percent by volume 1,1,1-trichloroethane and 25 percent by volume of a paraffin solvent available from Sun Oil Company under the designation Sun T Mineral Spirits (aliphatic hydrocarbon). The edge strengths of the cut edges are measured by beam load testing as in Example I and average 12,350 pounds per square inch, an increase of 27 percent over the edge strength of 9700 pounds per square inch for the cut edges of glass scored with no fluid.

EXAMPLE IV

To determine the effect of cutting fluids of the present invention on the working ranges of cutting wheels, scores are made through a fluid comprising 75 percent by volume 1,1,1-trichloroethane and 25 percent by volume naphtha as in Example I but under wheel loads varying from 3 to 26 pounds using cutting wheels having 134°, 145° and 150° cutting angles. Using a 7/32 inch (6 millimeter) tungsten carbide cutting wheel with a 134° cutting angle, acceptable scores are made under wheel loads ranging from 4 to 14 pounds compared with a working range of 4 to 10 pounds when no fluid is employed. Using the 145° cutting wheel, the working range with the cutting fluid of the present invention is from 5 to 16 pounds compared with a working range of from 5 to 12 pounds with no fluid. The working range for the 150° cutting wheel is from 8 to 16 pounds when no fluid is used and is extended to a range of from 7 to 20 pounds when the cutting fluid of the present invention is employed.

Figure 3:
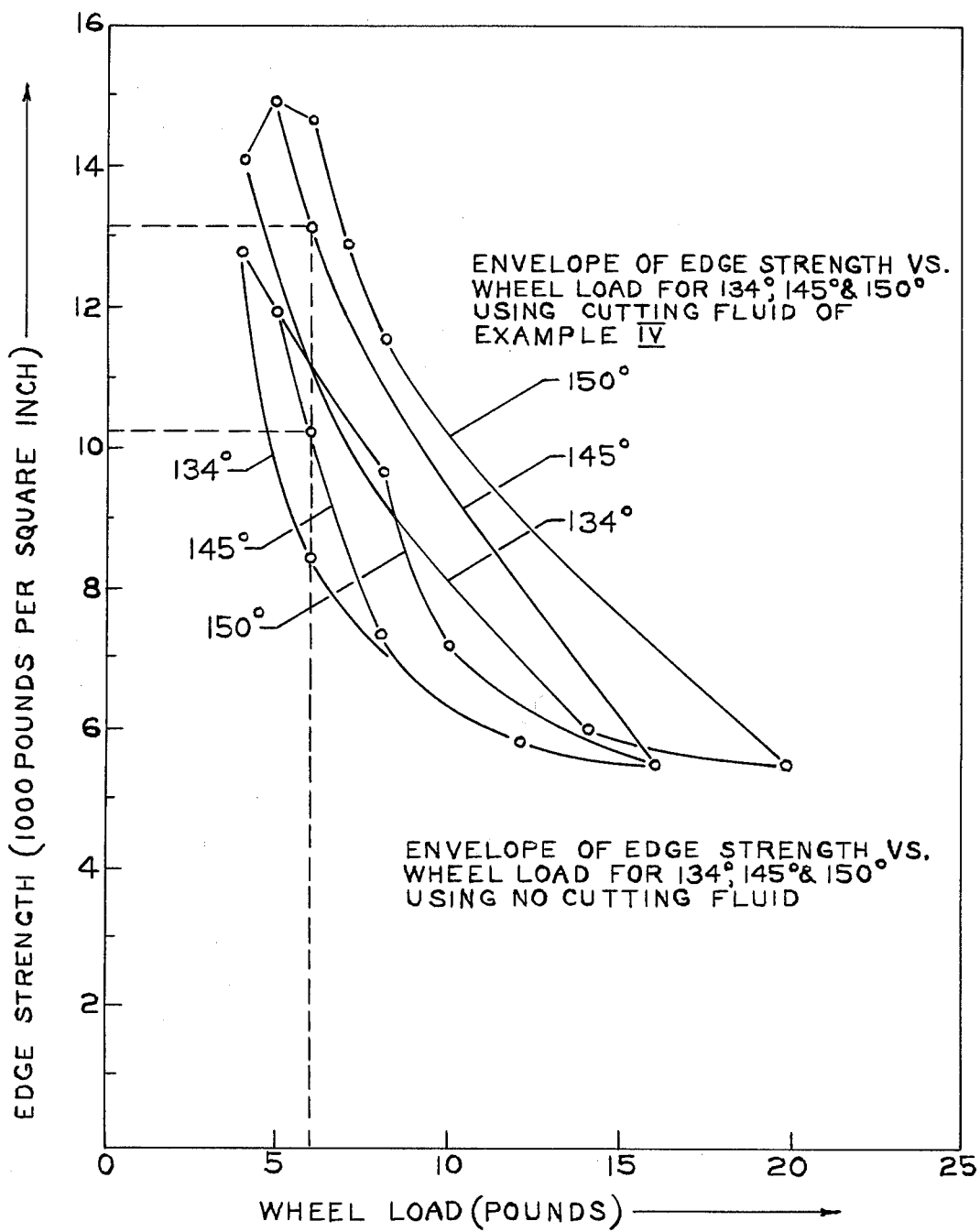
FIG. 3 compares cut edge strength of glass obtained by dry scoring with cut edge strength of glass obtained by scoring with a cutting fluid of the present invention as a function of wheel load within the respective working ranges for dry and wet scoring shown in FIG. 2.

The test strips scored at wheel loads within the working ranges of the cutting wheels are opened and the edge strengths of the cut edges measured as in Example I. FIG. 3 is a comparison of the cut edge strength versus wheel load between dry scoring and scoring with the cutting fluid of this example.

Cutting fluids and a method for performing a glass cutting operation using such fluids have been disclosed herein. Numerous variations and modifications of the cutting fluid compositions and method will become obvious to those skilled in the art. Such variations and modifications fall within the spirit and scope of the present invention and are intended to be within the scope of the appended claims.

We claim:

1. In a method for cutting glass comprising the steps of effecting a score on the surface of the glass with a scoring tool and propagating said score through the glass, the improvement which comprises scoring the glass in the presence of an essentially oil-free cutting fluid consisting essentially of from about 2 to 100 percent by volume of at least one highly volatile halogenated hydrocarbon and up to about 98 percent by volume of a highly volatile solvent selected from the group consisting of naphthenic, paraffinic, and aromatic solvents and mixtures thereof, said cutting fluid being present at the interface of the glass surface and the cutting tool to impart increased edge strength to the cut glass edge.

2. The improved method according to claim 1, wherein the scoring is accomplished with a force sufficient to effect a score which can be consistently opened without causing lateral vents to erupt with the glass surface adjacent the score.

3. The improved method according to claim 2, wherein the cutting fluid comprises by volume from about 2 to about 98 percent halogenated hydrocarbon and from about 98 to about 2 percent solvent.

4. The improved method according to claim 3, wherein said halogenated hydrocarbon is a polychlorinated hydrocarbon containing from one to about 18 carbon atoms and said solvent is a naphthenic solvent.

5. The improved method according to claim 4, wherein said halogenated hydrocarbon is selected from the group consisting of perchloroethylene, trichloroethylene, 1,1,1-trichloroethane, and mixtures thereof.

6. The improved method according to claim 5, wherein the cutting fluid comprises by volume from about 20 percent to about 80 percent trichloroethane and from about 80 percent to about 20 percent of a solvent comprising by volume about 54 percent paraffins, about 39 percent naphthenes and about 7 percent aromatic compounds.

7. The improved method according to claim 2, wherein said fluid continuously flows down over the cutting tool to provide lubrication before transferring to the interface of the glass surface and the scoring tool.

8. The improved method according to claim 2, wherein said fluid is applied to the glass surface along a predetermined line to be scored.

* * * * *